(12) United States Patent
Takahashi et al.

(10) Patent No.: US 6,370,162 B1
(45) Date of Patent: Apr. 9, 2002

(54) FRAME ALIGNER INCLUDING TWO BUFFERS

(75) Inventors: Hideaki Takahashi, Tokyo; Kazuo Nishitani, Shizuoka, both of (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/108,726

(22) Filed: Jul. 1, 1998

(30) Foreign Application Priority Data

Jul. 2, 1997 (JP) .............................................. 9-176251

(51) Int. Cl.[7] .................................................. H04J 3/06
(52) U.S. Cl. ........................ 370/517; 370/415; 370/429; 370/375; 370/516; 341/100; 341/101
(58) Field of Search ................................. 370/360, 362, 370/366, 412, 413, 415, 417, 419, 381, 429, 466, 467, 508, 516–519, 536, 537, 540, 542, 375, 376; 341/100, 101

(56) References Cited

U.S. PATENT DOCUMENTS

| 5,123,012 A | * | 6/1992 | Suzuki et al. ................ 370/379 |
| 5,654,967 A | * | 8/1997 | Okuyama et al. ............ 370/375 |
| 5,778,214 A | * | 7/1998 | Taya et al. ................... 713/400 |

FOREIGN PATENT DOCUMENTS

| JP | 63207235 | 8/1988 |
| JP | 63-228840 | 9/1988 |
| JP | 1-228228 | 9/1989 |
| JP | 3-10428 | 1/1991 |
| JP | 3-58639 | 3/1991 |
| JP | 3-107225 | 5/1991 |
| JP | 3-192839 | 8/1991 |
| JP | 3-283932 | 12/1991 |
| JP | 4-311120 | 11/1992 |
| JP | 5-102950 | 4/1993 |
| JP | 6-188871 | 7/1994 |
| JP | 7-23014 | 1/1995 |
| JP | 7-177137 | 7/1995 |

* cited by examiner

*Primary Examiner*—Laura S. Rao
*Assistant Examiner*—Phirin Sam
(74) *Attorney, Agent, or Firm*—Ostrolenk, Faber, Gerb & Soffen, LLP

(57) ABSTRACT

In a frame aligner, a serial/parallel converter converts an input serial data signal into a first parallel data signal. A first buffer receives the first parallel data signal to generate a first parallel data signal, and a second buffer receives the first parallel data signal to generate a second parallel data signal. A selector selects one of the first and second parallel data signals to generate a third parallel data signal. A parallel/serial converter converts the third parallel data signal into an output serial data signal. A buffer control circuit operates the first and second buffers at different phase timings in accordance with an input frame phase signal. A selector control circuit operates the selector in accordance with a difference in phase between the input frame phase signal and an output frame phase signal.

5 Claims, 15 Drawing Sheets

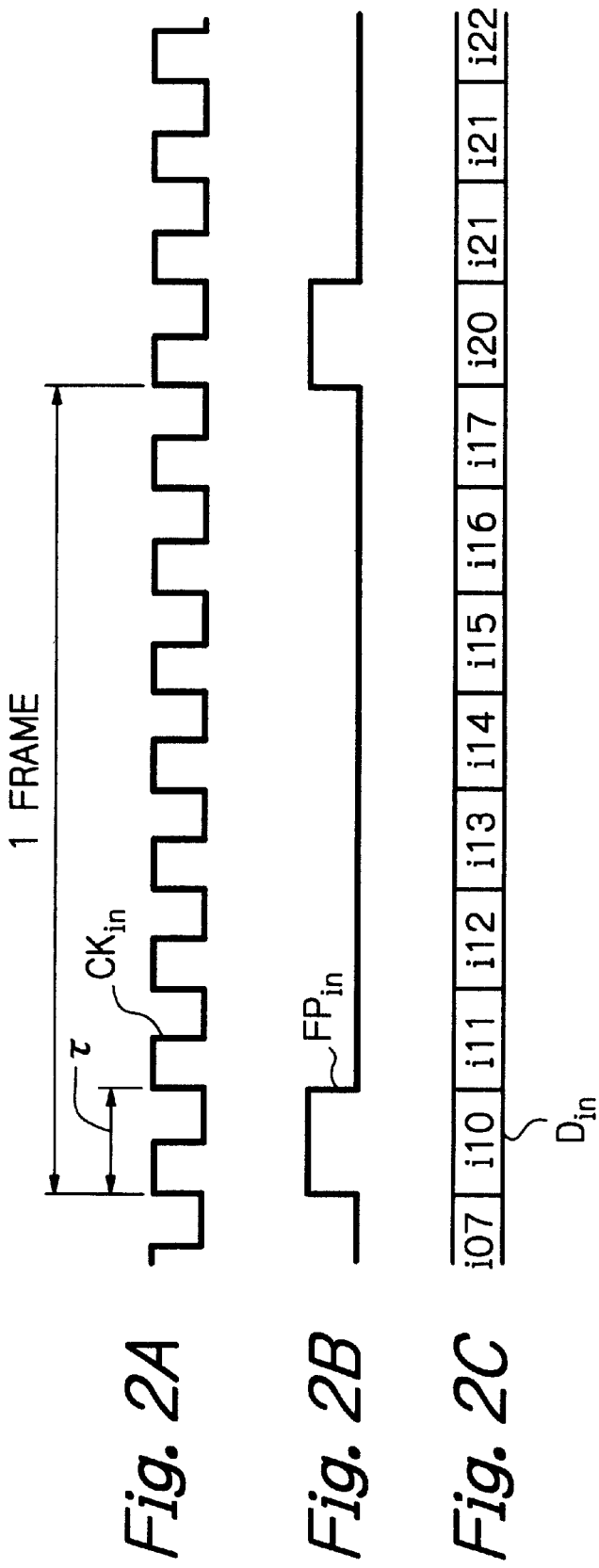

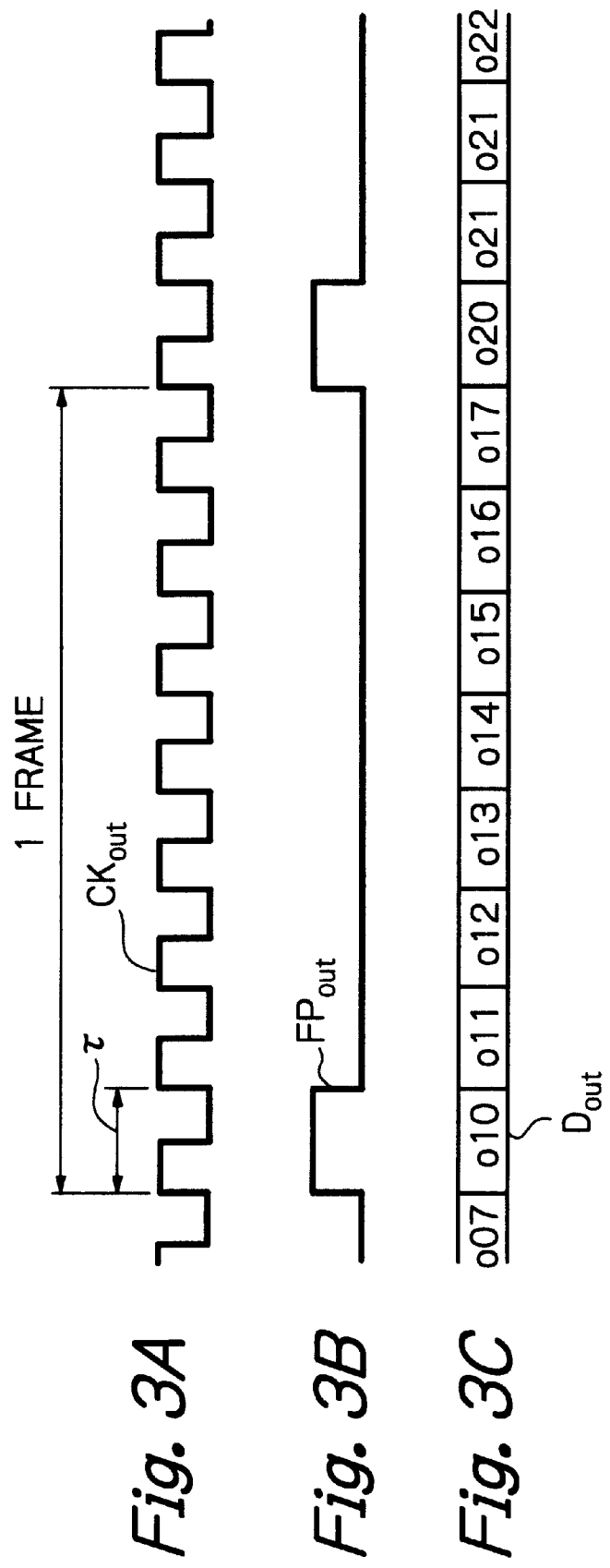

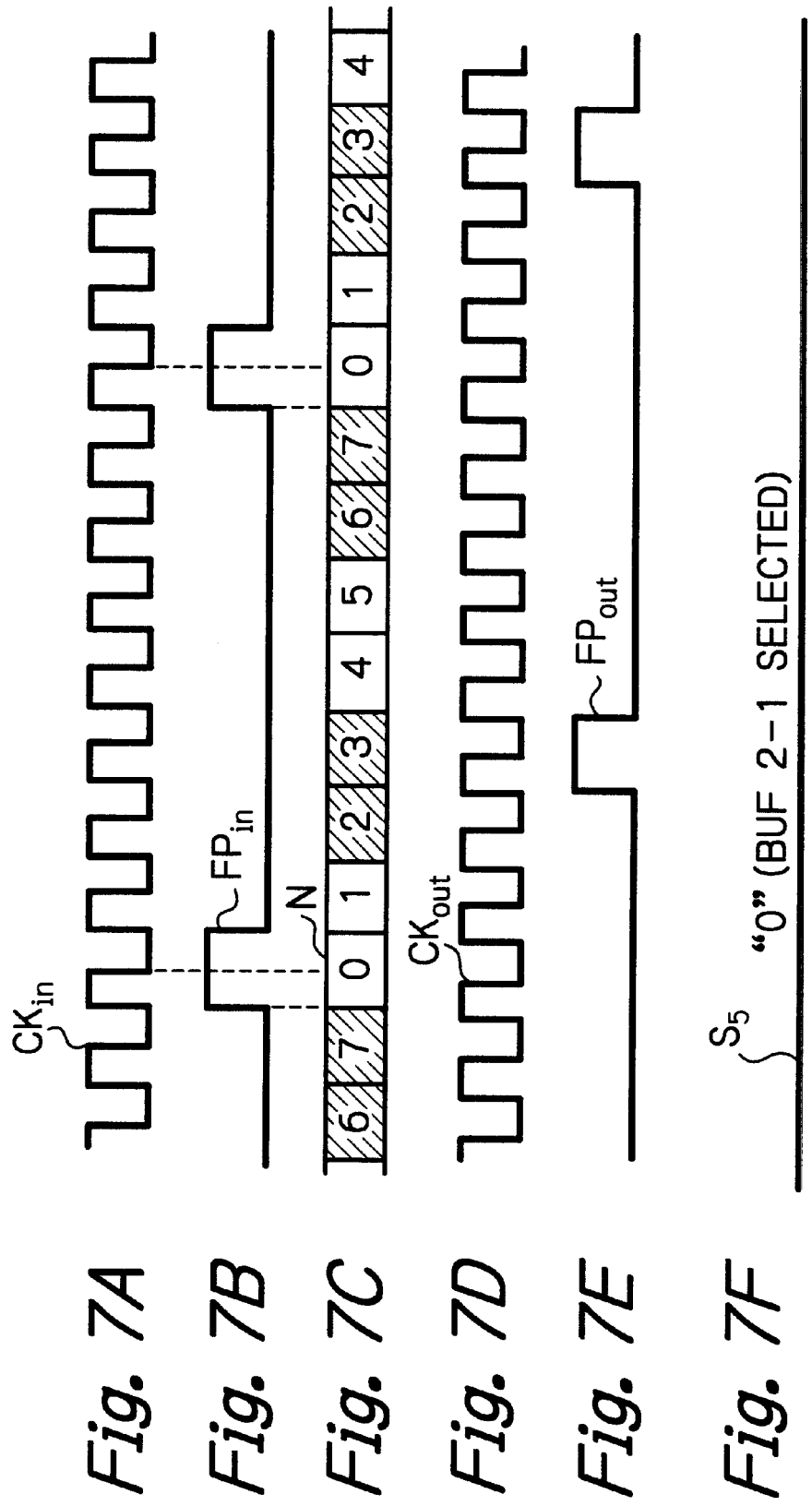

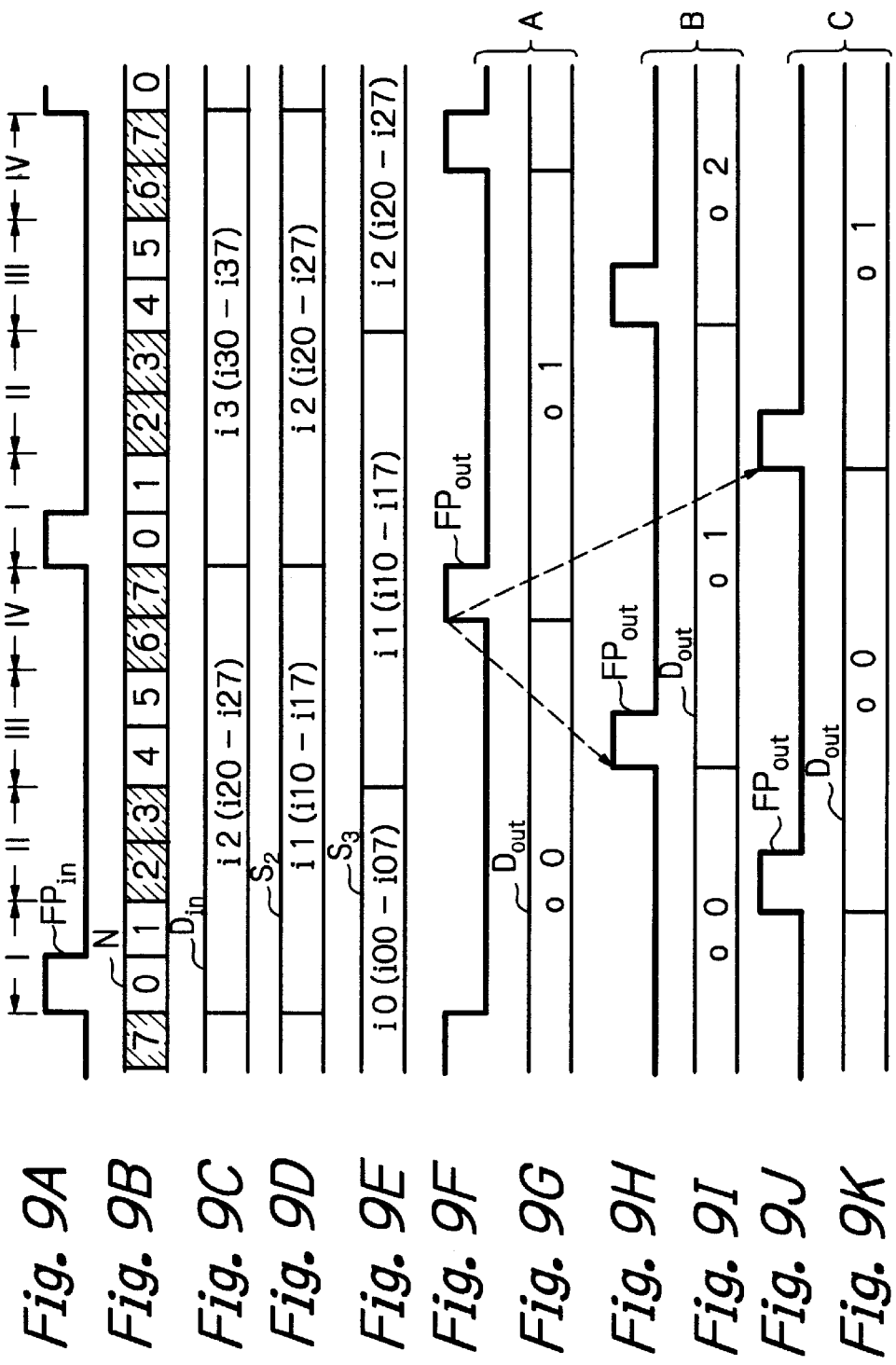

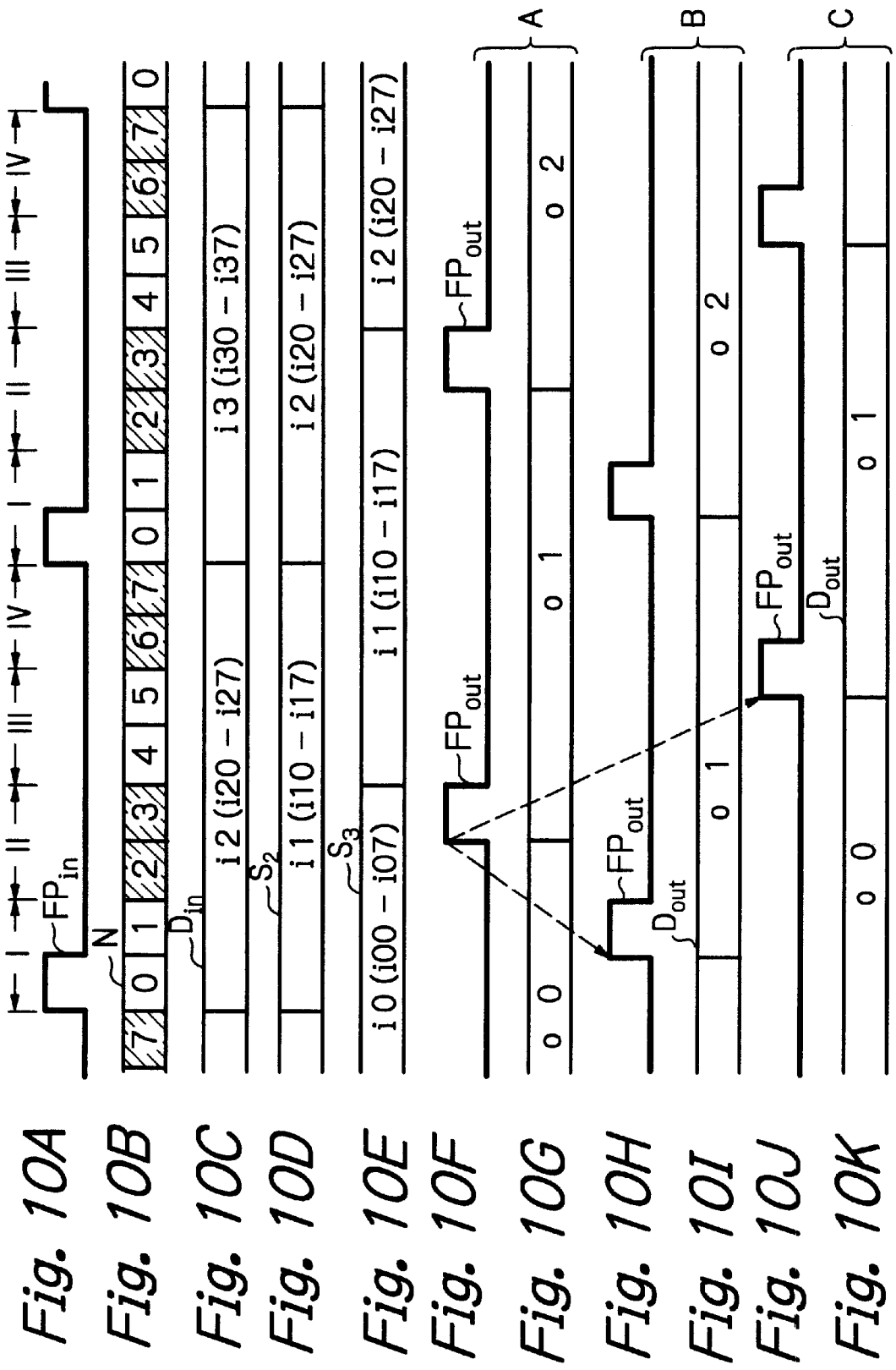

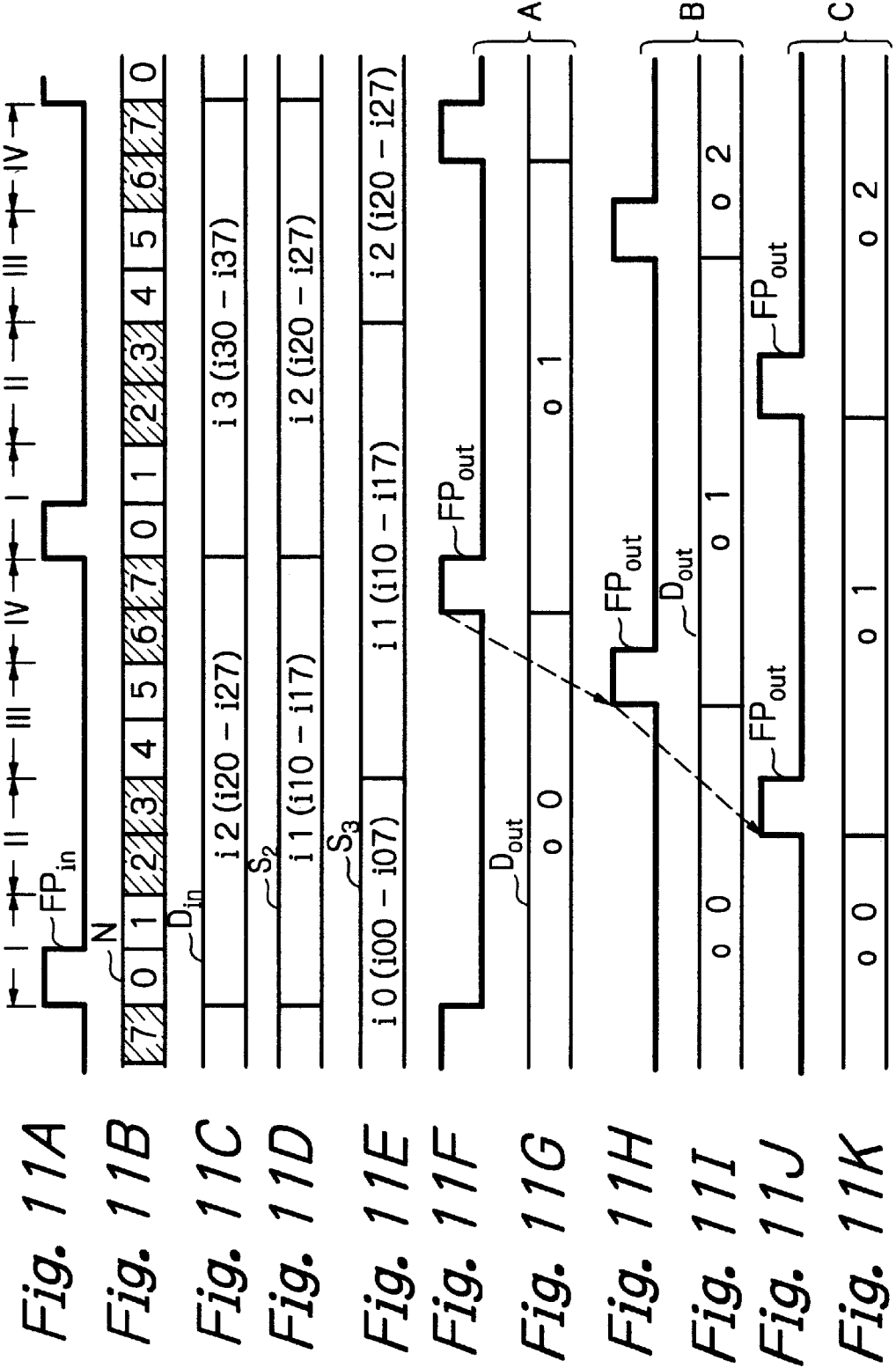

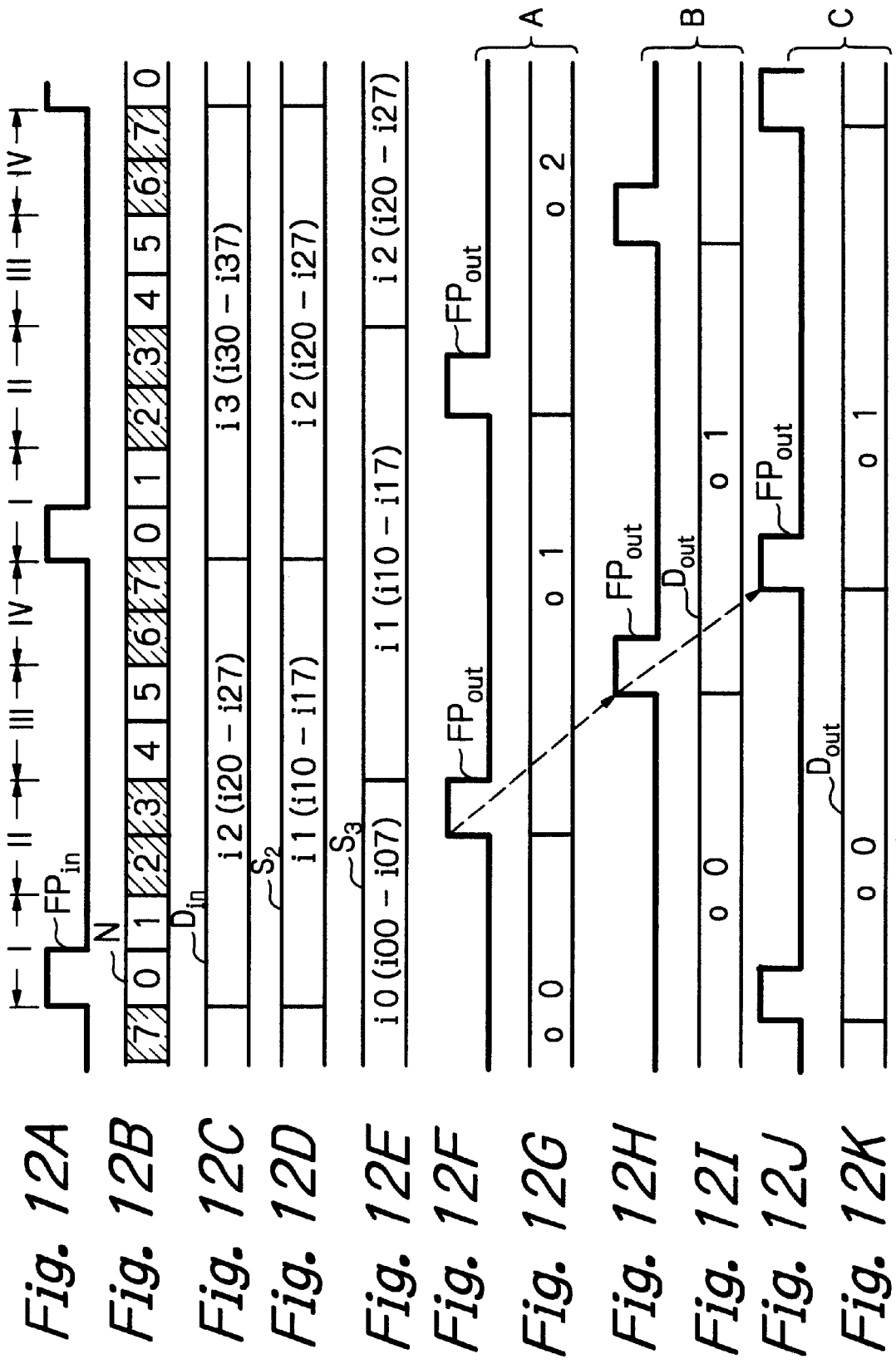

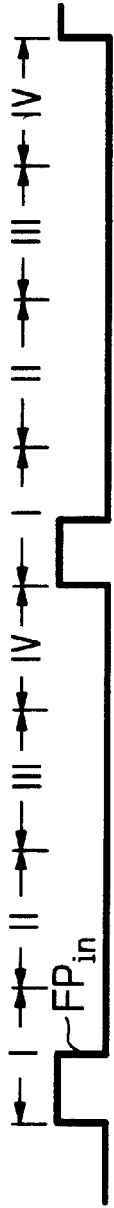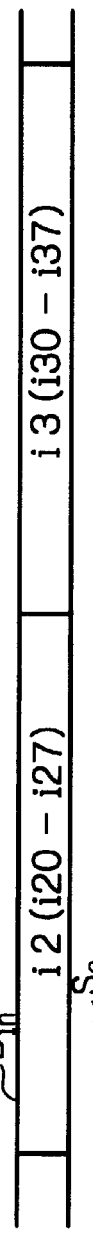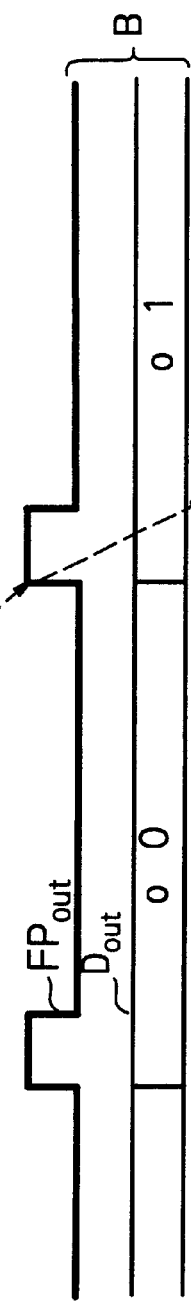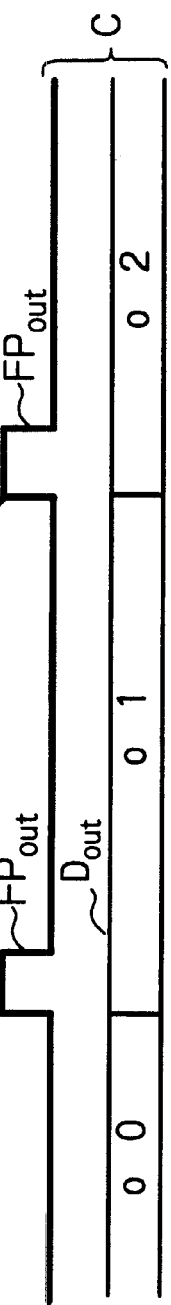

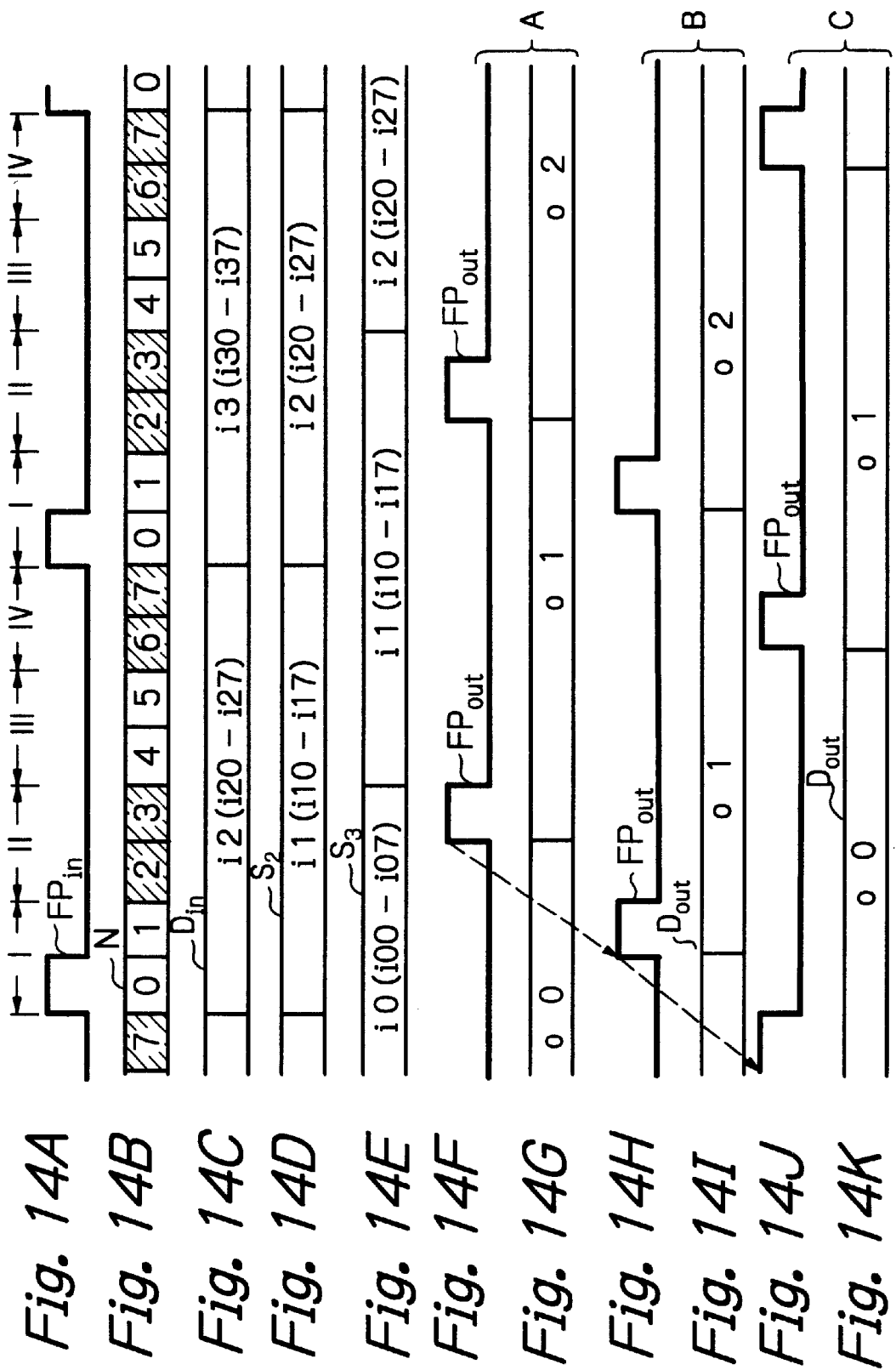

FRAME ALIGNER INCLUDING TWO BUFFERS

BACKGROUND OF THE INVENTION

1. Field of the Invention

The present invention relates to a frame aligner used in a communication apparatus using an integrated services digital network (ISDN) line when the 8 kHz frame phase of the ISDN line and the 8 kHz frame phase have an arbitrary or uncontrolled phase relationship.

2. Description of the Related Art

Prior art frame aligners include those practically used in transmission apparatuses forming digital transmission paths including those of the primary group (1.544Mb/s) as well as other high speed transmission paths. A prior art frame aligner used in such apparatuses is disclosed in JP-A-6-188871. Also, a prior art frame aligner that is used in apparatuses adapted to transmission paths with a transmission speed lower than that of primary group transmission paths is disclosed in JP-A-3-192839. Any of the prior art frame aligners includes an elastic memory (ES) for the purpose of realizing a data buffering function. An ES used in such a frame aligner is a sort of memory circuit. For example, the ES is constructed by a memory adapted to store data corresponding to 2 frames, a write circuit and a read circuit (see JP-A-6-188871). Also, the ES is constructed by a memory capacity corresponding to a frame of a high speed transmission path (see JP-A-192839).

The above-mentioned prior art frame aligners require an ES having a memory capacity corresponding to a frame or two frames of a high speed transmission path. This capacity will be 193 bits or twice 193 bits in the case of a primary group transmission path, which is very large relative to the 8 bits of the 8 kHz frame of ISDN. In the case where the transmission path is a 2M highway (2. 048Mb/s), a frame corresponds to 256 bits and hence the capacity will be 256 bits or 512 bits. Thus, in this case again, an ES having a very large memory capacity relative to the required capacity will have to be used. Therefore, when one of the prior art frame aligners is applied to an apparatus to be used with a transmission path that is an ISDN, the entire circuit will become very large.

Additionally, when a small capacity frame aligner circuit is used for an apparatus to be used with an ISDN, it will typically be realized in the form of large scale integrated circuit (LSI) along with other component circuits of the apparatus for the purpose of down-sizing and cost reduction. However, the ES of any of the prior art frame aligners normally operates as an independent unit and hence is not adapted to LSI and it is difficult for it to be integrally formed with other circuits. Thus, the prior art frame aligners are accompanied by a problem of the difficulty with which it is down-sized if it is used with an ISDN.

SUMMARY OF THE INVENTION

Therefore, It is an object of the present invention to provide a small size frame aligner adapted to a communication apparatus that uses an ISDN line and having a short frame length.

According to the present invention, in a frame aligner, a serial/parallel converter converts an input serial data signal into a first parallel data signal. A first buffer receives the first parallel data signal to generate a first parallel data signal, and a second buffer receives the first parallel data signal to generate a second parallel data signal. A selector selects one of the first and second parallel data signals to generate a third parallel data signal. A parallel/serial converter converts the third parallel data signal into an output serial data signal. A buffer control circuit for operating the first and second buffers at different phase timings in accordance with an input frame phase signal. A selector control circuit operates the selector in accordance with a difference in phase between the input frame phase signal and an output frame phase signal.

Thus, the buffers are provided instead of the ES of the prior art frame aligner, which makes the frame aligner small in size.

BRIEF DESCRIPTION OF THE DRAWINGS

The present invention will be more clearly understood from the description as set forth below, with reference to the accompanying drawings, wherein:

FIGS. 2A, 2B and 2C are timing diagrams showing the input clock signal, the input frame phase signal and the input serial data signal of FIG. 1;

FIGS. 3A, 3B and 3C are timing diagrams showing the output clock signal, the output frame phase signal and the output serial data signal of FIG. 1;

FIGS. 4A through 4H are timing diagrams showing the operation of the serial/parallel converter, the buffers and the buffer control circuit of FIG. 1;

FIGS. 7A through 7F and 8A through 8F are timing diagrams showing the operation of the selector and the selector control circuit of FIG. 1; and FIGS. 9A through 9K, 10A through 10K, 11A through 11K, 12A through 12K, 13A through 13K and 14A through 14K are timing diagrams showing the operation of the selector and the selector control circuit of FIG. 1 where the difference in phase between the input frame phase signal and the output frame phase signal is changed.

DESCRIPTION OF THE PREFERRED EMBODIMENT

Figure 1:
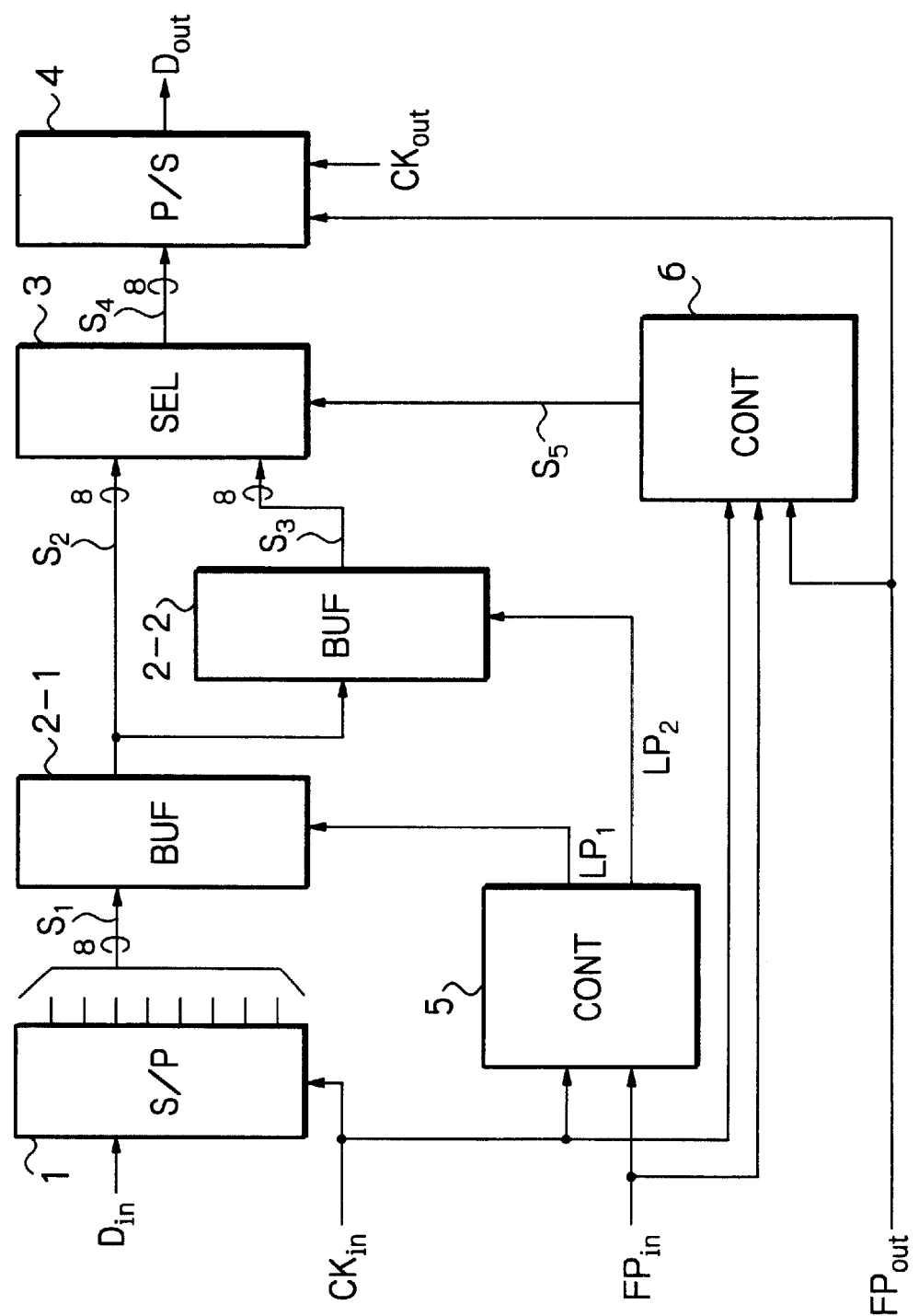
FIG. 1 is a block circuit diagram illustrating an embodiment of the frame aligner according to the present invention.

In FIG. 1, which illustrates an embodiment of the frame aligner according to the present invention, reference numeral 1 designates a serial/parallel converter for sampling an input serial data signal $D_{in}$, in synchronization with an input clock signal $CK_{in}$ and generating an 8-bit output signal $S_1$. The 8-bit output signal $S_1$ is stored by a load pulse signal $LP_1$ in an 8-bit buffer 2-1 which generates an 8-bit output signal $S_2$. The 8-bit output signal $S_2$ is stored by a load pulse signal $LP_2$ in an 8-bit buffer 2-2 which generates an 8-bit output signal $S_3$.

One of the output signals $S_2$ and $S_3$ is selected by a selector 3 that generates an 8-bit output signal $S_4$. A parallel/serial converter 4 performs a parallel/serial conversion upon the 8-bit output signal $S_4$ to generate an output serial data signal $D_{out}$.

A buffer control circuit 5 receives an input frame phase signal $FP_{1n}$, as well as the input clock signal $CK_{in}$ to generate the load pulse signals $LP_1$ and $LP_2$. In this case, each time the buffer control circuit 5 receives the input phase signal $PH_{in}$, the buffer control circuit generates the load pulse signal $LP_1$. Also, each time the buffer control circuit 5 receives four pulses of the input clock signal $CK_{in}$ after reception of the input frame phase $FP_{in}$, the buffer control circuit generates the load pulse signal $LP_2$. For example, the buffer control circuit 5 is constructed by a counter for counting the pulses of the input clock signal $CK_{in}$ and a comparator for comparing the value of the counter with a predetermined value such as 4. In this case, the counter is cleared by the input frame phase signal $FP_{in}$.

The selector 3 is controlled by a selector control circuit 6 which receives an output frame phase signal $FP_{out}$ as well as the input frame phase signal $FP_{in}$ and the input clock signal $CK_{in}$ to generate a selection signal $S_5$. For example, the selector control circuit 6 is constructed by a counter for counting a difference between the input frame phase signal $FP_{in}$ and the output frame phase signal $FP_{out}$ using the pulses of the input clock signal $CK_{in}$ and a comparator for comparing the value of the counter with predetermined values. If the difference is within a first predetermined interval, the selector control circuit 6 causes the selection signal $S_5$ to be "0" for the selector 3 to select the output signal $S_2$. On the other hand, if the difference is within a second predetermined interval, the selector control circuit 6 causes the selection signal $S_5$ to be "1" for the selector 3 to select the output signal $S_3$. Otherwise, the state of the selector 3 is unchanged. This will be explained later in detail.

The operation of the frame aligner of FIG. 1 will be explained with reference to FIGS. 2A, 2B, 2C, 3A, 3B, 3C, 4A through 4H, 5A through 5D, 6A, 6B, 6C, 7A through 7F, 8A through 8F, 9A through 9K, 10A through 10K, 11A thorough 11K, 12A through 12K, 13A through 13K, and 14A through 14K, which are applied to a 64 kb/s digital line of one channel of a B-channel of an ISDN.

FIGS. 2A, 2B and 2C are timing diagrams of the input clock signal $CK_{in}$, the input frame phase signal $FP_{in}$ and the input serial data signal $D_{in}$, respectively, of FIG. 1. The input clock signal $CK_{in}$ as shown in FIG. 2A has a frequency of 64 kHz. The input serial data signal $D_{in}$ as shown in FIG. 2C synchronizes with rising edges of the input clock signal $CK_{in}$. Also, the input frame phase signal $FP_{in}$ synchronizes with rising edges of every eight pulses of the input clock signal $CK_{in}$, and therefore, the input frame phase signal $FP_{in}$ has a frequency of 8 kHz. Note that the input frame phase signal $FP_{in}$ has a high level of a one clock period τ.

The input serial data signal $FP_{in}$ designates a header of one frame of the input serial data signal $D_{in}$ which is formed by 8-bit data.

FIGS. 3A, 3B and 3C are timing diagrams of the output clock signal $CK_{out}$, the output frame phase signal $FP_{out}$ and the output serial data signal $D_{out}$, respectively, of FIG. 1. The relationship among the output clock signal $CK_{out}$, the output frame phase signal $FP_{out}$ and the output serial data signal $D_{out}$ is substantially the same as the relationship among the input clock signal $CK_{in}$, the input frame phase signal $FP_{in}$ and the input serial data signal $D_{in}$. The frequency of the output clock signal $CK_{out}$ is the same as that of the input clock signal $CK_{in}$ over a long time period. Also, the frequency of the output frame phase signal $FP_{out}$ is the same as that of the input frame phase signal $FP_{in}$ over a long time period. On the other hand, a difference in phase between the output clock signal $CK_{out}$ and the input clock signal $CK_{in}$ varies, and also, a difference in phase between the output frame phase signal $FP_{out}$ and the input frame phase signal $FP_{in}$ varies. That is, these differences in phase jitter over a short time period, and fluctuate over a long time period. A total value of the jitter and fluctuation is much smaller than one frame, usually, smaller than one bit data length.

The operation of the serial/parallel converter 1, the buffers 2-1 and 2-2, and the buffer control circuit 5 of FIG. 1 is explained next with reference to FIGS. 4A through 4H. Note that FIGS. 4A, 4B, and 4C correspond to FIGS. 2A, 2B and 2C, respectively.

The serial/parallel converter 1 is constructed by a shift register operated by falling edges of the input clock signal $CK_{in}$ as shown in FIG. 4A. Therefore, every time the input frame phase signal $FP_{in}$ rises, one frame data (8 bits) is stored in the serial/parallel converter 1. For example, one frame data (8 bits) i1 (i10–i17), i2 (i20–i27) or i3 (i30–i37) is stored in the serial/parallel converter 1 as shown in FIG. 4D.

Since the load pulse $LP_1$ is approximately the same as the input frame phase signal $FP_{in}$ as shown in FIGS. 4B and 4E, the frame data i1, i2 or i3 is maintained in the buffer 2-1 for eight clock periods $8_\tau$ as shown in FIG. 4G.

On the other hand, since the load pulse $LP_2$ is approximately the same as formed by delaying the load pulse $LP_1$ by four clock periods $4_\tau$ as shown in FIGS. 4E and 4F, the frame data i1, i2 or i3 is maintained in the buffer 2-2 for eight clock periods $8_\tau$ as shown in FIG. 4H.

Thus, each of the frame data is maintained by the buffers 2-1 and 2-2 for twelve clock periods $16_\tau$.

The operation of the selector 3 and the parallel/serial converter 4 of FIG. 1 is explained next with reference to FIGS. 5A, 5B, 5C and 5D. Note that FIGS. 5A, 5B and 5D correspond to FIGS. 3A, 3B and 3C, respectively.

Figures 5A, 5B, 5C, 5D:
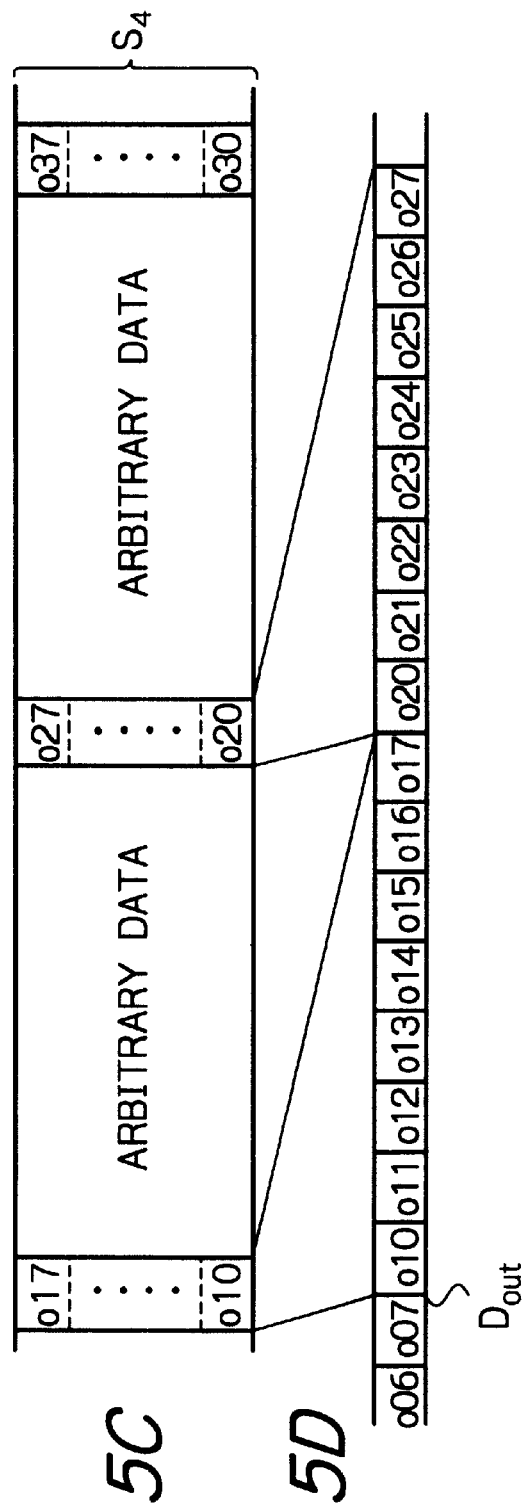
FIGS. 5A through 5D are timing diagrams showing the operation of the parallel/serial converter of FIG. 1.

The output signal $S_4$ of the selector 3 is either the output signal $S_2$ of the buffer 2-1 or the output signal $S_3$ of the buffer 2-2. The output signal $S_4$ of the selector 3 is fetched by the parallel/serial converter 4 at each rising edge of the output frame phase signal $FP_{out}$ as shown in FIG. 5B. For example, one frame data o1 (o10–o17), o2 (o20–o27) or o3 (o30–o37) is fetched by the parallel/serial converter 4.

The parallel/serial converter 4 is constructed by a shift register operated by rising edges of the output clock signal $CK_{out}$ as shown in FIG. 5A. Therefore, every time the input clock signal $CK_{in}$ rises, one bit data is output as the output serial data signal $D_{out}$ as shown in FIG. 5D.

Note that, since the parallel/serial converter 4 fetches one frame data only at a rising timing of the output frame phase signal $FP_{out}$, other frame data of the selector 3 does not affect the operation of the parallel/serial converter 4 (see arbitrary data of FIG. 5C).

The operation of the selector control circuit 6 of FIG. 1 is explained next with reference to FIGS. 6A, 6B and 6C. In this case, the selector control circuit 6 is constructed by a microcomputer.

Figure 6A:
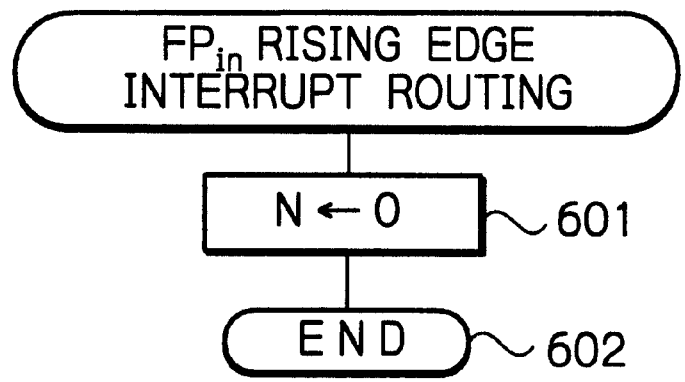
FIGS. 6A, 6B and 6C are flowchart showing the operation of the selector control circuit of FIG. 1.

FIG. 6A is an interrupt routine carried out by receiving a rising edge of the input frame phase signal $FP_{in}$.

At step 601, a counter value N is cleared.

Then, the routine of FIG. 6A is completed by step 602.

Figure 6B:
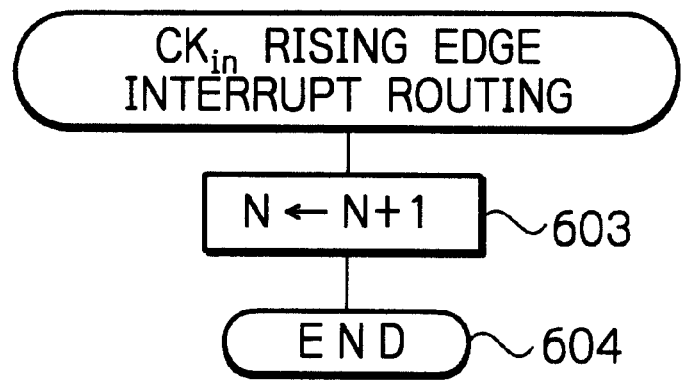

FIG. 6B is an interrupt routine carried out by receiving a rising edge of the input clock signal $CK_{in}$.

At step 603, a counter value N is incremented by 1.

Then, the routine of FIG. 6B is completed by step 604.

Figure 6C:
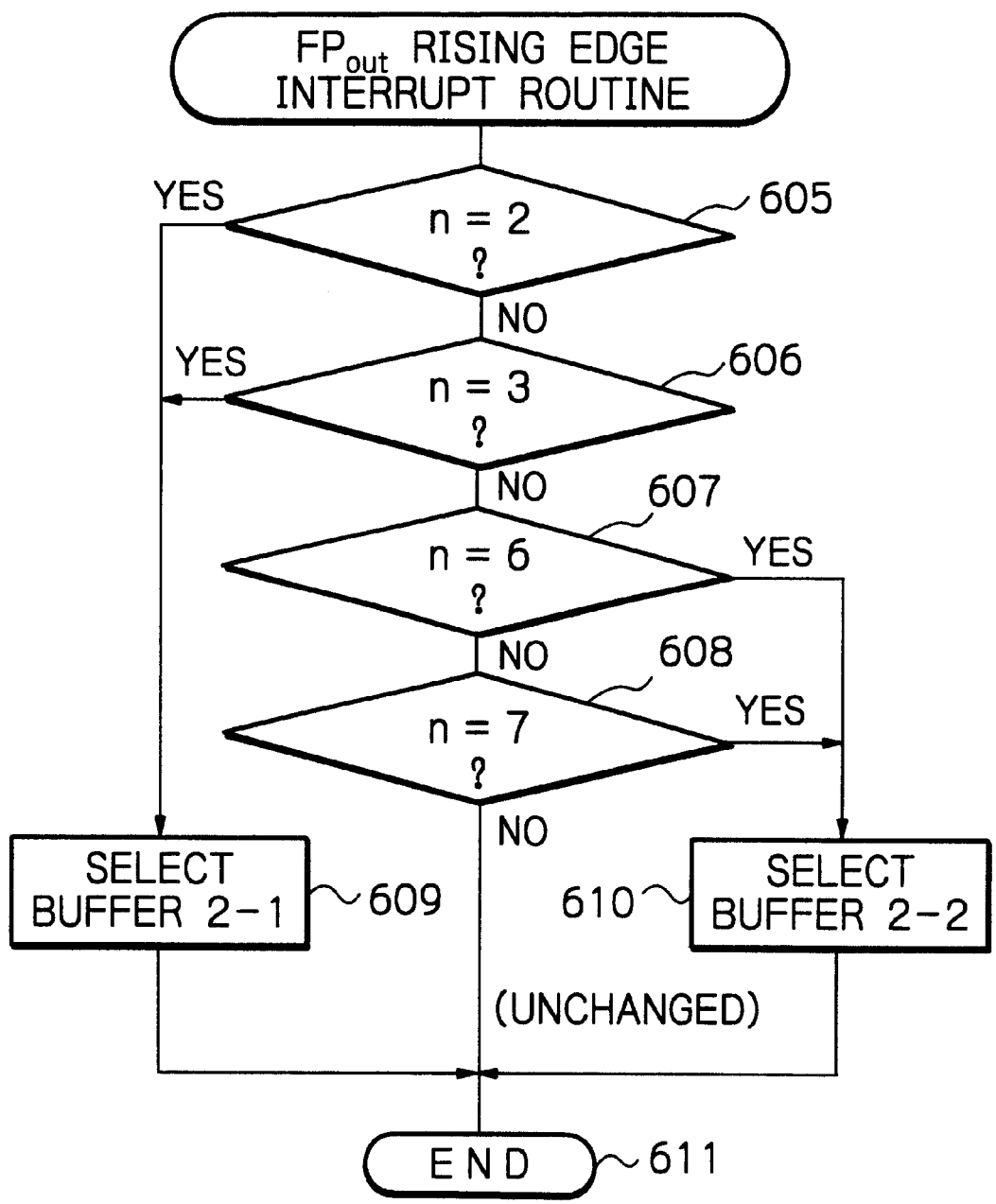
Figures 8A, 8B, 8C, 8D, 8E, 8F:
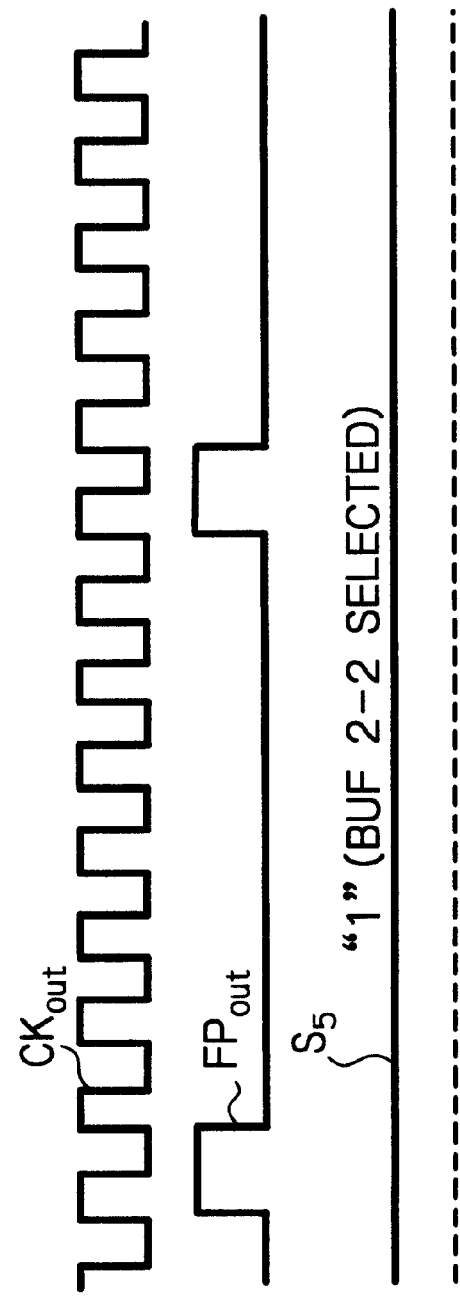

FIG. 6C is an interrupt routine carried out by receiving an rising edge of the output frame phase signal $FP_{out}$.

At step 605, it is determined whether or not the counter value N is 2.

At step 606, it is determined whether or not the counter value N is 3.

At step 607, it is determined whether or not the counter value N is 6.

At step 608, it is determined whether or not the counter value N is 7.

As a result, if N=2 or 3, the control proceeds to step 609 which causes the selection signal $S_5$ to be "0", thus selecting the buffer 2-1. On the other hand, if N=6 or 7, the control proceeds to step 610 which causes the selection signal $S_5$ to be "1", thus selecting the buffer 2-2.

Also, if N=0, 1, 4, 5 or 8, the control directly proceeds to step 611. Therefore, the selection state of the selector 3 is unchanged.

For example, as shown in FIGS. 7A through 7F, when the rising edge of the output frame phase signal $FP_{out}$ is located within a range defined by N=2 and 3, the buffer 2-1 is selected.

Also, as shown in FIGS. 8A through 8F, when the rising edge of the output frame phase signal $FP_{out}$ is located within a range defined by N=6 and 7, the buffer 2-2 is selected.

The operation of the frame aligner of FIG. 1 where the difference in phase between the input frame phase signal $FP_{in}$ and the output frame phase signal $FP_{out}$ is changed is explained next. Here, four intervals I, II, III and IV are defined for one frame period. That is, the interval I is defined by N=0 and N=1, the interval II is defined by N=2 and N=3, the interval III is defined by N=4 and N=5, and the interval IV is defined by N=6 and 7.

Assume that the input frame phase signal $FP_{in}$, the counter value N and the input serial data $D_{in}$ are changed as shown in FIGS. 9A, 9B and 9C, respectively, and therefore, the output signals $S_2$ and $S_3$ of the buffers 2-1 and 2-2 are as shown in FIGS. 9D and 9E.

Initially, as shown in FIG. 9F, the rising edge of the output frame phase signal $FP_{out}$ is located within the interval IV, the selector 3 selects the buffer 2-2. As a result, the serial output data signal $D_{out}$ is changed as shown in FIG. 9G. This is defined as state A.

When the output frame phase signal $FP_{out}$ is changed in relation to the input frame phase signal $FP_{in}$ as shown in FIG. 9H, i.e., when the state A as defined by FIGS. 9F and 9H is changed to state B as defined by FIGS. 9H and 9I, the rising edge of the output frame phase signal $FP_{out}$ is located within the interval III, so that the selection state of the selector 3 is unchanged. Therefore, the serial output data signal $D_{out}$ is changed as shown in FIG. 9I.

Also, when the output frame phase signal $FP_{out}$ is changed in relation to the input frame phase signal $FP_{in}$ as shown in FIG. 9J, i.e., when the state A as defined by FIGS. 9F and 9G is changed to state C as defined by FIGS. 9J and 9K, the rising edge of the output frame phase signal $FP_{out}$ is located within the interval I, so that the selection state of the selector 3 is unchanged. Therefore, the serial output data signal $D_{out}$ is changed as shown in FIG. 9K.

Thus, as shown in FIGS. 9A through 9K, when the rising edge of the output frame phase signal $FP_{out}$ is changed within the intervals III, IV and I, conversion from the input serial data $D_{in}$ to the output serial data $D_{out}$ is carried out without dropping data bits or superposing data bits, since the selection of the buffer 2-2 is unchanged.

Next, FIGS. 10A through 10K, where FIGS. 10A through 10E are the same as FIGS. 9A through 9E, respectively, will be explained.

Initially, as shown in FIG. 10F, the rising edge of the output frame phase signal $FP_{out}$ is located within the interval II, the selector 3 selects the buffer 2-1. As a result, the serial output data signal $D_{out}$ is changed as shown in FIG. 10G. This is defined as state A.

When the output frame phase signal $FP_{out}$ is changed in relation to the input frame phase signal $FP_{in}$ as shown in FIG. 10H, i.e., when the state A as defined by FIGS. 10F and 10H is changed to state B as defined by FIGS. 10H and 10I, the rising edge of the output frame phase signal $FP_{out}$ is located within the interval I, so that the selection state of the selector 3 is unchanged. Therefore, the serial output data signal $D_{out}$ is changed as shown in FIG. 10I.

Also, when the output frame phase signal $FP_{out}$ is changed in relation to the input frame phase signal $FP_{in}$ as shown in FIG. 10J, i.e., when the state A as defined by FIGS. 10F and 10G is changed to state C as defined by FIGS. 10J and 10K, the rising edge of the output frame phase signal $FP_{out}$ is located within the interval III, so that the selection state of the selector 3 is unchanged. Therefore, the serial output data signal $D_{out}$ is changed as shown in FIG. 10K.

Thus, as shown in FIGS. 10A through 10K, when the rising edge of the output frame phase signal $FP_{out}$ is changed within the intervals, I, II and III, conversion from the input serial data $D_{in}$ to the output serial data $D_{out}$ is carried out without dropping data bits or overlapping data, since the selection of the buffer 2-1 is unchanged.

Next, FIGS. 11A through 11K, where FIGS. 11A through 11E are the same as FIGS. 9A through 9E, respectively, will be explained.

Initially, as shown in FIG. 11F, the rising edge of the output frame phase signal $FP_{out}$ is located within the interval IV, the selector 3 selects the buffer 2-2. As a result, the serial output data signal $D_{out}$ is changed as shown in FIG. 11G. This is defined as state A.

When the output frame phase signal $FP_{out}$ is changed in relation to the input frame phase signal $FP_{in}$ as shown in FIG. 11H, i.e., when the state A as defined by FIGS. 11F and 11H is changed to state B as defined by FIGS. 11H and 11I, the rising edge of the output frame phase signal $FP_{out}$ is located within the interval III, so that the selection state of the selector 3 is unchanged. Therefore, the serial output data signal $D_{out}$ is changed as shown in FIG. 11I.

Also, when the output frame phase signal $FP_{out}$ is changed in relation to the input frame phase signal $FP_{in}$ as shown in FIG. 11J, i.e., when the state B as defined by FIGS. 11H and 11I is changed to state C as defined by FIGS. 11J and 11K, the rising edge of the output frame phase signal $FP_{out}$ is located within the interval II, so that the selection state of the selector 3 is changed. That is, the buffer 2-1 is selected. In this case, however, since the data of the buffer 2-1 is the same as that of the buffer 2-2, the serial output data signal $D_{out}$ is changed as shown in FIG. 11K.

Thus, as shown in FIGS. 11A through 11K, when the rising edge of the output frame phase signal $FP_{out}$ is changed from the interval IV via the interval III to the interval II, conversion from the input serial data $D_{in}$ to the output serial data $D_{out}$ is carried out without dropping data bits or overlapping data bits, since the buffer 2-1 has the same data as the buffer 2-2.

Next, FIGS. 12A through 12K, where FIGS. 12A through 12E are the same as FIGS. 9A through 9E, respectively, will be explained.

Initially, as shown in FIG. 12F, the rising edge of the output frame phase signal $FP_{out}$ is located within the interval II, the selector 3 selects the buffer 2-1. As a result, the serial output data signal $D_{out}$ is changed as shown in FIG. 12G. This is defined as state A.

When the output frame phase signal $FP_{out}$ is changed in relation to the input frame phase signal $FP_{in}$ as shown in FIG. 12H, i.e., when the state A as defined by FIGS. 12F and 12H is changed to state B as defined by FIGS. 12H and 12I, the rising edge of the output frame phase signal $FP_{out}$ is located within the interval III, so that the selection state of the selector 3 is unchanged. Therefore, the serial output data signal $D_{out}$ is changed as shown in FIG. 12I.

Also, when the output frame phase signal $FP_{out}$ is changed in relation to the input frame phase signal $FP_{in}$ as shown in FIG. 12J, i.e., when the state B as defined by FIGS. 12H and 12I is changed to state C as defined by FIGS. 12J and 12K, the rising edge of the output frame phase signal $FP_{out}$ is located within the interval IV, so that the selection state of the selector 3 is changed. That is, the buffer 2-2 is selected. In this case, however, since the data of the buffer 2-2 is the same as that of the buffer 2-1, the serial output data signal $D_{out}$ is changed as shown in FIG. 12K.

Thus, as shown in FIGS. 12A through 12K, when the rising edge of the output frame phase signal $FP_{out}$ is changed from the interval II via the interval III to the interval IV, conversion from the input serial data $D_{in}$ to the output serial data $D_{out}$ is carried out without dropping data bits or overlapping data bits, since the buffer 2-2 has the same data as the buffer 2-1.

In view of FIGS. 9A through 9K, 10A through 10K, 11A through 11K and 12A through 12K, as long as the rising edge of the output frame phase signal $FP_{out}$ is located within a range defined by the consecutive intervals I, II, III, IV and I, conversion from the input serial data signal $D_{in}$ to the output serial data signal $D_{out}$ can be carried out without dropping data or overlapping data bits.

Next, FIGS. 13A through 13K, where FIGS. 13A through 13E are the same as FIGS. 9A through 9E, respectively, will be explained.

Initially, as shown in FIG. 13F, the rising edge of the output frame phase signal $FP_{out}$ is located within the interval IV, the selector 3 selects the buffer 2-2. As a result, the serial output data signal $D_{out}$ is changed as shown in FIG. 13G. This is defined as state A.

When the output frame phase signal $FP_{out}$ is changed in relation to the input frame phase signal $FP_{in}$ as shown in FIG. 13H, i.e., when the state A as defined by FIGS. 13F and 13H is changed to state B as defined by FIGS. 13H and 13I, the rising edge of the output frame phase signal $FP_{out}$ is located within the interval I, so that the selection state of the selector 3 is unchanged. Therefore, the serial output data signal $D_{out}$ is changed as shown in FIG. 13I.

Also, when the output frame phase signal $FP_{out}$ is changed in relation to the input frame phase signal $FP_{in}$ as shown in FIG. 13J, i.e., when the state B as defined by FIGS. 13H and 13I is changed to state C as defined by FIGS. 13J and 13K, the rising edge of the output frame phase signal $FP_{out}$ is located within the interval II, so that the selection state of the selector 3 is changed. That is, the buffer 2-1 is selected. In this case, since the data of the buffer 2-1 is different from that of the buffer 2-2, the serial output data signal $D_{out}$ is changed as shown in FIG. 13K.

Thus, as shown in FIGS. 13A through 13K, when the rising edge of the output frame phase signal $FP_{out}$ is changed from the interval IV via the interval I to the interval II, conversion from the input serial data $D_{in}$ to the output serial data $D_{out}$ is carried out with dropping data bits, since the buffer 2-1 has different data from the buffer 2-2.

Next, FIGS. 14A through 14K, where FIGS. 14A through 14E are the same as FIGS. 9A through 9E, respectively, will be explained.

Initially, as shown in FIG. 14F, the rising edge of the output frame phase signal $FP_{out}$ is located within the interval II, the selector 3 selects the buffer 2-1. As a result, the serial output data signal $D_{out}$ is changed as shown in FIG. 14G. This is defined as state A.

When the output frame phase signal $FP_{out}$ is changed in relation to the input frame phase signal $FP_{in}$ as shown in FIG. 14H, i.e., when the state A as defined by FIGS. 14F and 14H is changed to state B as defined by FIGS. 14H and 14I, the rising edge of the output frame phase signal $FP_{out}$ is located within the interval I, so that the selection state of the selector 3 is unchanged. Therefore, the serial output data signal $D_{out}$ is changed as shown in FIG. 14I.

Also, when the output frame phase signal $FP_{out}$ is changed in relation to the input frame phase signal $FP_{in}$ as shown in FIG. 14J, i.e., when the state B as defined by FIGS. 14H and 14I is changed to state C as defined by FIGS. 14J and 14K, the rising edge of the output frame phase signal $FP_{out}$ is located within the interval IV, so that the selection state of the selector 3 is changed. That is, the buffer 2-2 is selected. In this case, since the data of the buffer 2-2 is different from that of the buffer 2-1, the serial output data signal $D_{out}$ is changed as shown in FIG. 14K.

Thus, as shown in FIGS. 14A through 14K, when the rising edge of the output frame phase signal $FP_{out}$ is changed from the interval II via the interval 1 to the interval I, conversion from the input serial data $D_{in}$ to the output serial data $D_{out}$ is carried out with overlapping data bits, since the buffer 2-2 has different data from the buffer 2-1.

In the transition of the difference in phase between the input frame phase signal $FP_{in}$ and the output frame phase signal $FP_{out}$ as shown in FIGS. 13A through 13K and FIGS. 14A through 14K, however, since the fluctuations in this frame phase difference are very small and practically such dropped data bits and/or overlapped data bits occur only in a case where the rising edge of the output frame phase signal $FP_{out}$ is found at the interval I or III when the power source is turned ON and subsequently the selector control circuit 6 inverts the value of the selection signal $S_5$ because of the fluctuations in the frame phase difference. Thereafter, possible cases will only be the one where the rising edge of each of the output frame phase signal $FP_{out}$ is found at any of the intervals I, II and III, the one where the rising edge of the output frame phase signal $FP_{out}$ is found at any of the intervals III, IV and I, the one where the rising edge of the output frame phase signal $FP_{out}$ is shifted from the section II to the interval IV and the one where the rising edge of the output frame phase signal $FP_{out}$ is shifted from the interval I to the interval I so that no dropped data bits nor overlapped data bits occur. If the rising edge of the output frame phase signal $FP_{out}$ is shifted to any of the interval I, II, III and IV under this condition, no dropped data bits nor overlapped data bits occur and any fluctuations in the difference in phase between the input frame phase signal $FP_{in}$ and the output frame phase signal $FP_{out}$ can be absorbed.

Thus, the frame aligner of FIG. 1 functions properly along with the effect of absorbing fluctuations in the phase difference between the input frame phase signal $FP_{in}$ and the output frame phase signal $FP_{out}$.

As explained hereinabove, according to the present invention, the frame aligner has a small circuit configuration compared with any prior art frame aligner circuit for the primary group. Additionally since the circuit components of the frame aligner according to the present invention are basic function elements of LSI, it can easily be realized in the form of LSI to make it down-sized, lightweight, power saving and hence economic. Further, if realized in the form of LSI, it can further reduce the number of components and show an enhanced level of reliability, and the frame aligner can be manufactured with a high productivity.

What is claimed is:

1. A frame aligner comprising:
   a serial/parallel converter for receiving an input serial data signal and converting said input serial data signal into a first parallel data signal;
   a first buffer, connected to said serial/parallel converter, for receiving said first parallel data signal to generate a first parallel data signal;
   a second buffer, connected to said first buffer, for receiving said first parallel data signal to generate a second parallel data signal;
   a selector, connected to said first and second buffers, for selecting one of said first and second parallel data signals to generate a third parallel data signal;
   a parallel/serial converter, connected to said selector, for receiving said third parallel data signal and converting said third parallel data signal into an output serial data signal;
   a buffer control circuit, connected to said first and second buffers, for operating said first and second buffers at different phase timings in accordance with an input frame phase signal; and
   a selector control circuit, connected to said selector, for operating said selector in accordance with a difference in phase between said input frame phase signal and an output frame phase signal.

2. The frame aligner as set forth in claim 1, wherein said selector control circuit operates said selector to select said first buffer when the difference in phase between said input frame phase signal and said output frame phase signal is within a first predetermined interval of one input frame determined by said input frame phase signal,
   said selector control circuit operating said selector to select said second buffer when the difference in phase between said input frame phase signal and said output frame phase signal is within a second predetermined interval of one input frame determined by said input frame phase signal,
   said selector control circuit not changing a state of said selector when the difference in phase between said input frame phase signal and said output frame phase signal is within an interval other than said first and second predetermined intervals.

3. The frame aligner as set forth in claim 1, wherein one frame defined by said input frame phase signal is divided into first, second, third and fourth intervals,
   said buffer control circuit operating said first and second buffers in synchronization with said first and third intervals, respectively,
   said selector control circuit operating said selector to select said first buffer when the difference in phase between said input frame phase signal and said output frame phase signal is within said second interval,
   said selector control circuit operating said selector to select said second buffer when the difference in phase between said input frame phase signal and said output frame phase signal is within said fourth interval,
   said selector control circuit not changing a state of said selector when the difference in phase between said input frame phase signal and said output frame phase signal is within said first and third intervals.

4. A frame aligner comprising:
   a serial/parallel converter for receiving an input serial data signal and an input clock signal and converting said input serial data signal into a first parallel data signal in synchronization with said input clock signal;
   a first buffer, connected to said serial/parallel converter, for receiving said first parallel data signal to generate a first parallel data signal in response to a first load signal;
   a second buffer, connected to said first buffer, for receiving said first parallel data signal to generate a second parallel data signal in response to a second load signal;
   a selector, connected to said first and second buffers, for selecting one of said first and second parallel data signals to generate a third parallel data signal;
   a parallel/serial converter, connected to said selector, for receiving said third parallel data signal, an output clock signal and an output frame phase signal, and converting said third parallel data signal into an output serial data signal in synchronization with said output clock signal and said output frame phase signal;
   a buffer control circuit, connected to said first and second buffers, for receiving said input clock signal and an input frame phase signal to generate said first load signal at a first phase timing in synchronization with said input frame phase signal and said second load signal at a second phase timing after said first phase timing; and
   a selector control circuit, connected to said selector, for receiving said input frame phase signal, said output clock signal and an output frame phase signal and operating said selector,
   said selector control circuit comprising:
      means for clearing a counter value by receiving said input frame phase signal;
      means for counting up said counter value by receiving said counter value;
      means for determining whether or not said counter value is within a first range when said output frame phase signal is received;
      means for operating said selector to selector said first buffer when said counter value is within said first range;
      means for determining whether or not said counter value is within a second range when said output frame phase signal is received;
      means for operating said selector to selector said second buffer when said counter value is within said second range; and
      means for not changing a state of said selector when said counter value is not within said first and second ranges.

5. An 8-bit frame aligner comprising:
   a serial/parallel converter including an 8-bit shift register for receiving an input serial data signal and an input clock signal and converting said input serial data signal into a first 8-bit data signal in synchronization with said input clock signal;
   a first 8-bit buffer, connected to said serial/parallel converter, for receiving said first 8-bit data signal to generate a first 8-bit data signal in response to a first load signal;
   a second buffer, connected to said first buffer, for receiving said first 8-bit data signal to generate a second 8-bit data signal in response to a second load signal;
   a selector, connected to said first and second buffers, for selecting one of said first and second 8-bit data signals to generate a third 8-bit data signal;

a parallel/serial converter, connected to said selector, for receiving said third 8-bit data signal, an output clock signal and an output frame phase signal, and converting said third 8-bit data signal into an output serial data signal in synchronization with said output clock signal and said output frame phase signal;

a buffer control circuit, connected to said first and second buffers, for receiving said input clock signal and an input frame phase signal to generate said first load signal at a first phase timing in synchronization with said input frame phase signal and said second load signal at a second phase timing obtained by delaying said first load signal with four pulses of said input clock signal; and a selector control circuit, connected to said selector, for receiving said input frame phase signal, said output clock signal and an output frame phase signal and operating said selector, said selector control circuit comprising:

means for clearing a counter value by receiving said input frame phase signal;

means for counting up said counter value by receiving said counter value;

means for determining whether or not said counter value is 2 or 3 when said output frame phase signal is received;

means for operating said selector to selector said first buffer when said counter value is 2 or 3;

means for determining whether or not said counter value is 6 or 7 when said output frame phase signal is received;

means for operating said selector to selector said second buffer when said counter value is 6 or 7; and means for not changing a state of said selector when said counter value is 0, 1, 4 or 6.

* * * * *